Patented Oct. 7, 1952

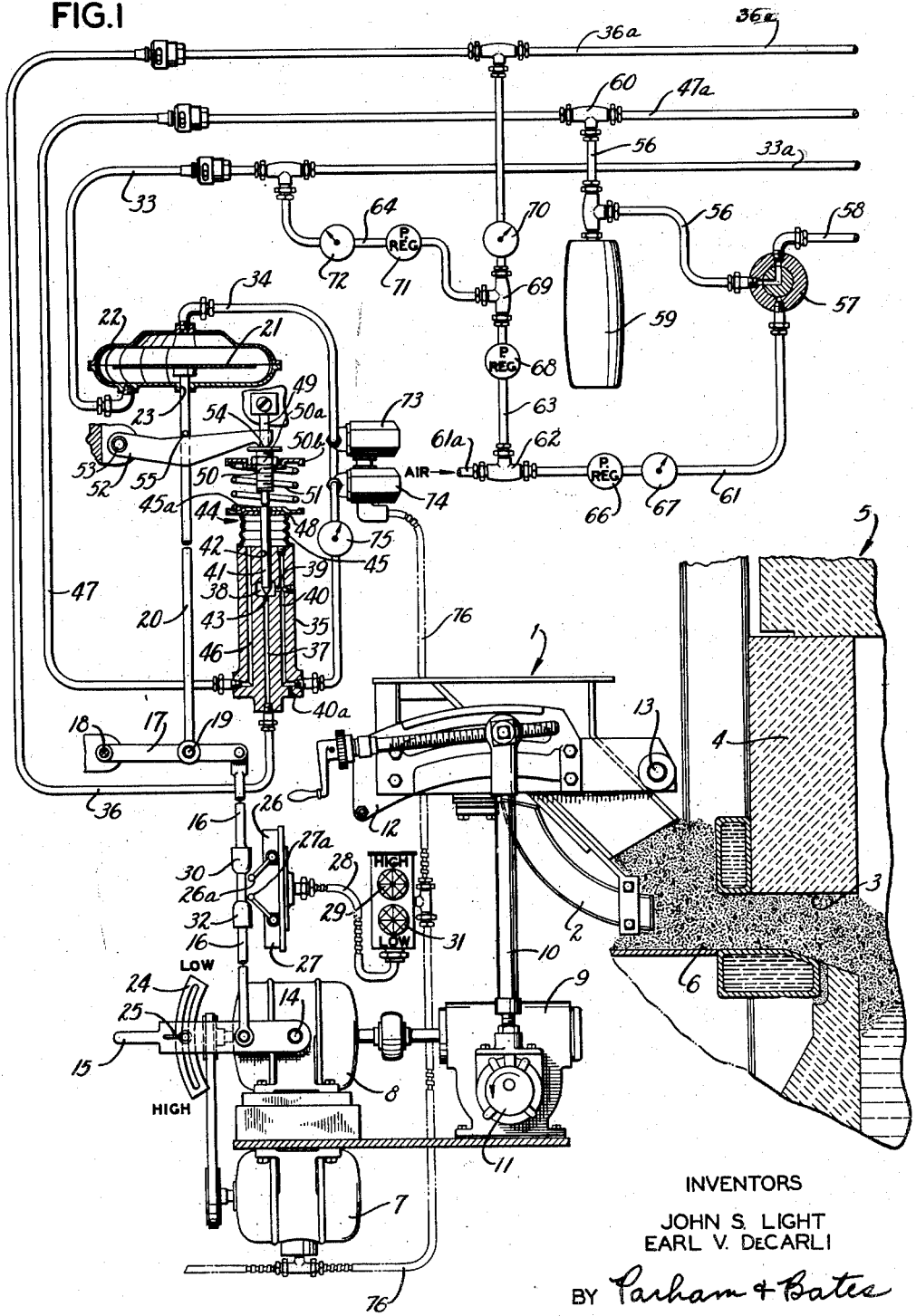

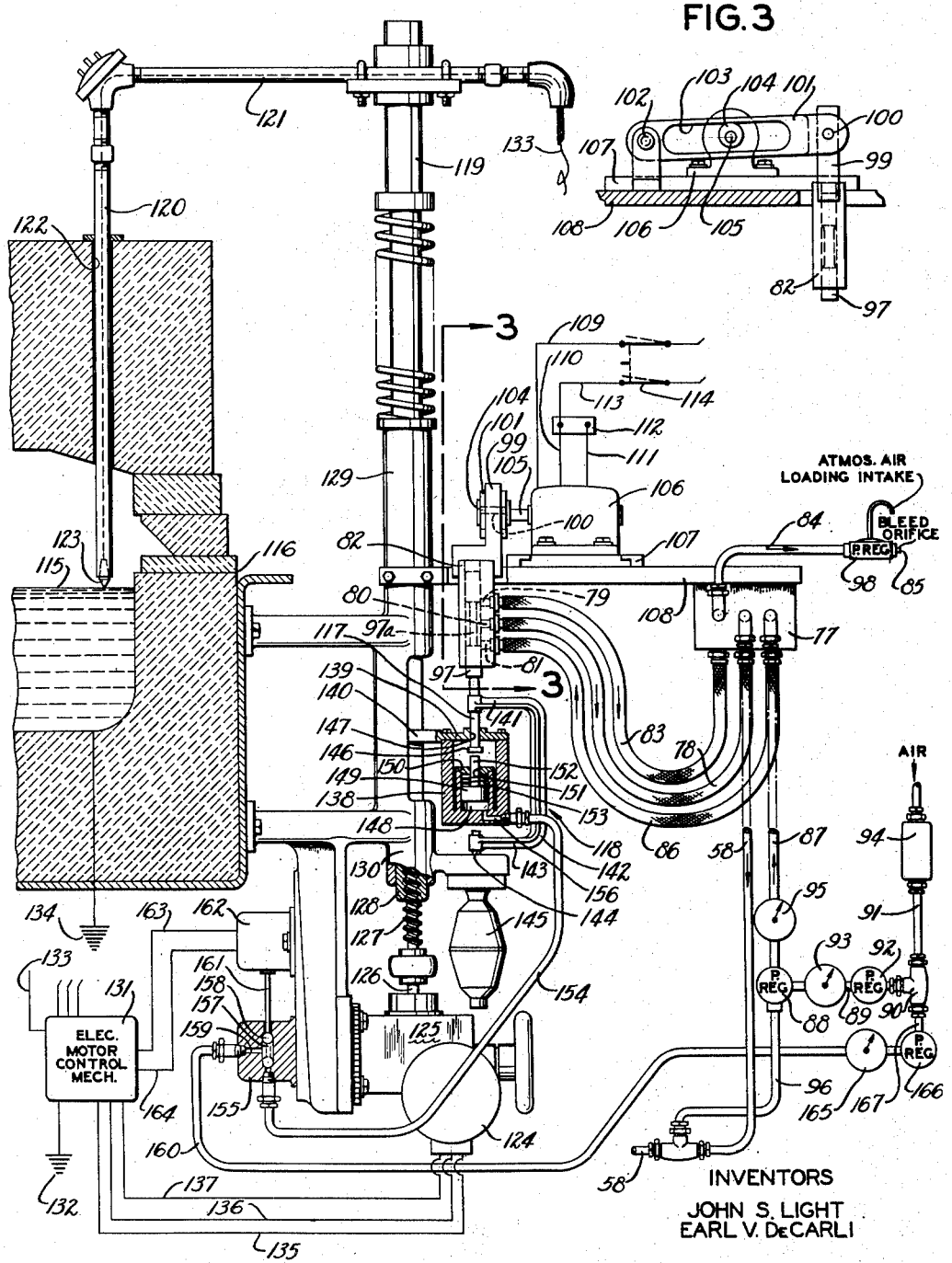

2,613,002

UNITED STATES PATENT OFFICE 2,613,002

MOLTEN GLASS LEVEL CONTROL
APPARATUS

John S. Light, Granby, and Earl V. De Carli, Ellington, Conn., assignors to Emhart Manufacturing Company, a corporation of Delaware Application September 17, 1948, Serial No. 49,748

15 Claims. (Cl. 214—18.2)

This invention relates to improvements in apparatus for automatically controlling the level of molten glass in a glass feeder forehearth or the like.

An object of the invention is to provide an automatic molten glass level control apparatus which is operable in response to departures of glass level in a container under control from a predetermined index level to effect adjustments proportional to such departures of the rate at which batch is charged to a glass melting tank in glass flow communication with such container.

A further object of the invention is to provide an automatic level control apparatus of the character described which includes provisions to enable it to be controlled manually at the beginning of a period of operation during pre-setting of the automatic provisions thereof or whenever necessary or desirable, as, for example, because of temporary failure or disability of any of the essential elements of the automatic set-up.

A further object of the invention is to provide an automatic level control apparatus of the character described which is operable to control the batch charging apparatus involved in such a way that the amount of batch charged at any given time is a function of the relation of the controlled level of glass to a control point and this relation is adjustable to a sensitivity such that the glass level will be kept close to the control point without instability in the control operation in the form of a "hunt" therefor.

A further object of the invention is to provide an automatic level control apparatus of the character described which will regulably control the charging rate of the batch charging apparatus involved relative to the correspondence of the glass level under control to its index or control point so that the batch charging rate will always be brought to and maintained at any value required to hold the level at the control point.

A further object of the invention is to provide an automatic level control apparatus of the character described by which each of a pair of batch chargers having alternating periods of activity and idleness may be controlled so that each idle charger, when it becomes active, will resume operation at the same speed or stroke that the other batch charger would have had, had it remained active.

Other objects of the invention are to provide an automatic glass level control apparatus of a relatively simple, serviceable construction, comprising parts which can be cooperatively assembled and operated with comparatively few adjustments; and one which will function reliably and accurately to control batch charging so as to change the charging pattern only in the quantity of batch in response to load changes.

Still other objects and advantages of the invention hereinafter will be pointed out or will become apparent from the following description of a practical embodiment thereof, as shown in the accompanying drawings, in which, Fig. 1 is a more or less diagrammatic and fragmentary view, showing a portion of a glass melting tank having a batch charger operatively associated therewith, together with connected elements of a mainly pneumatic control system as applied to a variable speed unit of the batch charger drive;

Fig. 2 is a view of a character similar to Fig. 1 but complementary thereto, showing the remainder of the mainly pneumatic control system as applied to a level gauging mechanism for detecting changes of level of molten glass in a forehearth or like container; and Fig. 3 is a detail of an operating connection between a motor and a vertically reciprocable valve casing included in the control, as such connection appears from a plane indicated by the line 3—3 of Fig. 2.

The automatic control apparatus of the invention in the form now preferred by us is mainly pneumatic in that air pressure is utilized in a system of connected lines, fluid pressure regulators, valves, motors, etc., to translate a deviation from a predetermined control or index level of the glass in the controlled container as detected by the glass level gauging mechanism into an appropriate adjustment of a variable speed unit in the drive of a batch charger, the operation of which is automatically controlled. In an installation having a single charger operating continuously or nearly so the level will be held to within limits not measurably differing from a straight line, for all more or less steady load conditions. The same would be true with twin chargers exactly balanced as to charging capacity at equal speeds.

As shown in Fig. 1, a batch charger, generally indicated at 1, includes an oscillatory charger member 2 operatively located in relation to charging port 3 in a vertical wall 4 of a glass melting tank, generally designated 5, so that each forward stroke of the member 2 will feed glass batch from a supply, indicated at 6, into the tank. The supply of batch 6 is delivered continuously in a known manner to the charger so as to fill the outer part of the charging opening 3 and to submerge at least a portion of the batch charging member 2, as is usual in charging operations involving a batch charger of the type shown. The working strokes of the charging member 2 are effected by driving it from a motor 7 through an intervening suitable transmission mechanism which comprises a variable speed unit 8, such as a conventional P. I. V. drive, driven by the motor and arranged to drive a gear reduction unit 9. The latter operates a connecting rod 10 through an eccentric crank mechanism 11 so as to oscillate a lever 12 of the batch charger about a horizontal axis, indicated at 13, the batch charging member 2 being suspended from the lever 12 so as to be alternately advanced on a working stroke and retracted in preparation for the next working stroke.

The adjustable speed unit 8 includes an adjusting shaft 14. In the illustrative apparatus of the present invention, an adjusting lever 15 is operatively attached to this shaft. The lever 15 is connected by a vertical link 16 to one end of a lever 17 which is fulcrumed at its opposite end on a horizontal stud or shaft 18. The lever 17 is pivotally connected at 19 intermediate its length with one end of a vertical rod 20 which is carried by a diaphragm 21 of a springless diaphragm type air motor 22. The air motor 22 is fixed in position by any suitable supporting means, none shown, so that its axis is vertical and so that the rod 20 depends from the diaphragm 21 therein through a suitable opening 23 in the lower part of the diaphragm motor casing. It is apparent that operation of the diaphragm motor 22 will swing the adjusting lever 15 upward or downward, according to the direction of flexure of the diaphragm 21 of such motor so as to effect an adjustment of the speed of the variable speed unit 8 and hence of the speed or charging rate of the batch charger 1. As shown, an upward movement of the lever 15 will decrease this speed or charging rate while a downward movement of such lever will increase it.

A fixed position slotted arcuate strip 24 may be operatively positioned in relation to the lever 15 and will co-operate therewith to indicate at any time if the speed of operation of the charger is above or below a median speed and to what extent. A conventional clamping device, indicated at 25, may be employed to fasten the lever to the strip whenever desirable or required, as later explained herein. It may be desirable to give some further signal of an extremely high speed or low speed of the charger in response to the adjustment of the variable speed unit 8 by the lever 15. This may be done by an arrangement which includes two vertically spaced limit switches, designated 26 and 27, respectively. The switch 26 is operatively connected through suitable electrical connections, indicated by the cable 28, with a signal 29, which may be an electric light. A switch actuating abutment 30 on the vertical link 16 will engage and actuate an operating handle 26a of the limit switch 26 to close it on downward movement of the link to its lower limit so that the signal light 29 will be energized to indicate an undesirably high charging speed. A similar signal light, designated 31, to indicate an undesirably low charging speed is energized by closing of the limit switch 27 through operation of its handle 27a by a suitably located actuating abutment 32 on the link 16 on an extreme upward throw of such link.

The air motor 22 is controlled by air pressure from two lines, designated 33 and 34, respectively. The line 33 supplies air under pressure to the air motor 22 at one side—in this instance, the lower side—of the diaphragm 21. The line 34, of course, supplies air to the opposite or upper side of the air motor. One of these lines, in this instance the line 33, delivers air at a predetermined pressure, as for example, 15 pounds per square inch, to the air motor 22. This pressure is adjustable as hereinafter will be explained. The other line, 34, is connected through a pilot needle valve 35 to a supply line 36 which also may receive air from a source of supply of air under an adjusted pressure of, for example, 30 pounds per square inch. The needle valve 35 has a vertical intake passage 37 leading to a valve chamber 38 from which a lateral passage 39 leads to a vertical outlet passage 40 to which the line 34 to the upper part of the air motor 22 is operatively connected. A bleed opening 40a is provided for the outlet passage 40. A vertically movable valve needle 41 depends through a suitable bore 42 in the upper part of the needle valve into the chamber 38 for cooperation with a seat 43 provided by the junction of the upper part of the intake passage 37 with the bottom of the valve chamber 38. Thus, as the valve needle is shifted from its pre-set position, at which the pressure in the top of the diaphragm chamber from line 34 will balance the underneath pressure, from air line 33, it admits more or less air to outlet passage 40 and the line 34 to be bled off by bleed opening 40a. This will cause a temporary increase or decrease of the pressure on the upper side of the diaphragm.

The valve needle is controlled by a valve positioner, designated 44, comprising a bellows 45 which is positioned on top of the needle valve 35 so that air may pass to its interior through a vertical passage 46 in the needle valve wall from an air line 47, the passage 46 not being a part of the needle valve proper and having no communication with the above described valve passages and chamber. In this structural arrangement, the valve needle 41 depends from the central portion of the head 45a of the bellows 45 to which it is fixed at 48 by welding or in any other suitable known manner. Above and in axial alignment with the head of the bellows is a fixed position depending guide rod 49 carrying a vertically slidable externally threaded tubular spacer 50 carrying a nut 50a against which a disc or washer 50b is pressed by a coil spring 51 which has its lower end bearing on the head 45a of the bellows. A lever 52 is pivoted on a horizontal pivot element 53 so that its outer, free end bears at 54 upon the head of the tubular spacer 50. The intermediate portion of this lever engages beneath a pin 55 on the diaphragm rod 20. This valve positioner employs the principle of balanced operation, the bellows being spring loaded in opposition to the force exerted therein by the controlled air pressure from line 47 and passage 46.

It will be clear from the explanation thus given of the diaphragm motor and of the parts connected therewith that the diaphragm 21 will be flexed in its casing by an unbalance between the air pressures supplied to the air motor 22 from the lines 34 and 33, respectively. A rise or fall of controlled pressure in the line 47 is effective through the bellows 45 of the positioner to move the valve needle 41 relative to its seat. The pressure in the air motor 22 above the diaphragm thus may be increased or decreased relative to the air pressure therein below the diaphragm, whereby to cause flexure of the diaphragm and a proportional adjustment of the variable speed unit 8 of the charger drive to increase or decrease the speed of the charger as the case may be. As hereinbefore noted, the valve 35 has a bleed opening in the wall of its outlet passage 40. As the needle of the valve 35 moves, spring load on the bellows will change in relation to the force of the controlled air pressure. A flexure of the diaphragm of the air motor as just described, caused by a rise or fall of pressure in the controlled line which supplies air to the bellows, will be followed by return of the valve needle 41 to its former or pre-set position as soon as the positioner spring load air pressure balance has been restored, leaving the diaphragm at its then position. The speed of the charger thus will have been changed in proportion to change of pressure in line 47.

The pressure in the line 47 may be controlled by connection through a line 56 and a three-way valve 57 to a line 58 which, as hereinafter will be explained, carries air under pressure automatically controlled in response to variations of glass level in a controlled container from a predetermined index or control point. An air accumulator 59 may be operatively connected with the line 56 so as to smooth out the air stream passing through the line 47. The connection of the line 47 with the line 56 may be effected by a T, indicated at 60. Alternatively, the pressure to the line 56 and thence to the line 47 may be obtained by appropriate operation of the three-way valve 57, from a line 61. The line 61 is operatively connected with an air supply line 61a by a T 62. The supply line 61a also is operatively connected by the T 62 to a line 63 which supplies the line 36. The line 63 may be connected by a line 64 with the line 33. An adjustable pressure regulator 66 is incorporated in the line 61 downstream from the T 62 and a pressure gauge 67 also is provided at the downstream side of the pressure regulator. An adjustable pressure regulator 68 is incorporated in the line 63 upstream from a connection at 69 of the line 63 with the line 64 and a pressure gauge 70 is incorporated in this line downstream from the connection 69. In the line 64, an adjustable pressure regulator 71 is provided as is a pressure gauge 72, the regulator being located between the gauge 72 and the connection 69 with the line 63.

The structural arrangement just described permits manual setting of the charging rate of the batch charger 1 at the beginning of an operating period or during any emergency period thereafter when it is not possible or desirable to use the automatic control, hereinafter more specifically described. Thus, by turning the three-way valve 57 until it connects the lines 56 and 61, the air pressure passing through the line 47 to the valve positioner is controllable by the adjustable regulator 66 hereinbefore pointed out. Adjustment of the variable speed unit 8 may be effected by manual action to adjust the charging rate by the batch charger 1 suitably to attain the level desired in the controlled container and to maintain it. In starting operations, the lever 15 may be secured in adjusted position by the clamping device 25 while the link 16 of the automatic control mechanism is disconnected therefrom. The line 47 may be filled with air at the proper relative pressure for automatic control. When the fastening device 25 has been loosened, the lever has been operatively connected with the link 16, and the valve 57 appropriately turned, automatic control will be started or restored.

It may be noted at this point that line 34 is equipped with a pair of normally closed solenoid valves 73 and 74, respectively, placed nose to nose therein, and with a pressure gauge 75, the solenoid valves being electrically connected by means represented by the cable 76 with the electric motor 7 of the charger drive mechanism so as to be energized only when the motor is in operation. While a charger is idle, its P. I. V. unit cannot be adjusted and it, therefore, is necessary or desirable to prevent control pressure changes from having any effect. The solenoid valve 73, on the air motor side, while closed, will prevent escape of air from the top of the air motor chamber and the intervening upper portion of the line 34 while the other solenoid valve, when closed, will prevent air from the lower portion of the line 34 passing to such chamber. This arrangement of two conventional solenoid valves, placed nose to nose in the line 34, is superior to a single conventional solenoid valve, since air pressure under the plunger of such a valve tends to open it while air pressure over the plunger tends to keep the valve shut. The arrangement described therefore makes a better seal.

It further is to be noted that in an installation comprising two of the batch chargers 1 operating alternately to charge batch to the melting tank 5, as is well known in the art, the second batch charger which is not shown in the drawings will be provided with speed adjusting control mechanism like that hereinbefore described in detail for the illustrated charger 1. Fig. 1 shows pressure air lines designated 36a, 47a, and 33a, respectively, identical with the lines 36, 47 and 33 and having like connections and functions and it is unnecessary to repeat illustration and description of the remainder of the speed adjusting control mechanism for the second batch charger.

Referring now more particularly to Fig. 2, it will be noted that the controlled pressure line 58 extends to a junction box 77 and thence is continued as a flexible conduit, designated 78, to the middle of three regularly and vertically spaced ports 79, 80 and 81, respectively, in a vertically reciprocable vertical spool valve casing 82, the port 80 being the middle port to which the conduit 78 is connected. The upper valve casing port 79 is connected by flexible conduit 83 with the junction box 77 and thence continued as an exhaust pipe 84 having a vent or discharge nozzle 85 of a predetermined fixed size. The lower valve casing port 81 is connected by a flexible tube 86 with the junction box and there is connected with a supply pipe 87 which is joined by a pressure regulator 88 with a supply pipe 89 which is connected by a suitable pipe fitting, shown as a T 90, with a main air intake pipe 91. The latter may receive air from any suitable source of supply of air under a suitable pressure, which may be within a range of from thirty to sixty pounds per square inch. The pipe 89 is provided with a regulator 92 which may be set to control the maximum to which pressure at the upstream side of the regulator 88 may rise, a gauge 93 being included in the line 89 between the regulators 92 and 88. The setting of the regulator 92 may be in the order of fifteen pounds per square inch, for example, where the supply pressure is within the range indicated, i. e., between thirty and sixty pounds per square inch. A filter 94 may be placed in the intake line 91. The regulator 88 may be of a known combination spring and fluid pressure loaded type which is adjustably set to maintain any desired pressure difference, say three pounds per square inch, between the outlet pressure and the fluid loading pressure, the outlet, of course, being to the pipe 87 which may be provided with a pressure gauge 95 downstream from the regulator 88. The fluid loading pressure is from the controlled pressure line 58 through a line 96 which leads to the loading bonnet of the regulator 88. The regulator 88 thus, in effect, is made to maintain a pressure difference across the spool valve casing 82 so that the rate of rise of pressure in controlled pressure line 58 will be constant, regardless of the pressure in such line, during the part of the oscillatory cycle produced by vertical reciprocation of the valve casing when line 86 is connected to conduit 78 and thence with line 58.

A vertically movable spool valve 97 is operatively disposed in the casing 82 and is provided with an annularly grooved intermediate portion 97a for controlling communication between the middle controlled pressure port 80 and the respective upper and lower ports 79 and 81, respectively. Thus, when the spool valve 97 is in an intermediate position, as shown in Fig. 2, the opposite ends of its annularly grooved portion 97a may extend just to or slightly past the adjacent sides of the upper and lower ports 79 and 81 so that any air from the supply line 86 entering the valve casing 82 around the grooved portion of the spool valve 97 may pass both through the control pressure lines 78 and exhaust line 83. The exhaust line is provided with a regulator, indicated at 98, near the vent or discharge nozzle outlet thereof and this regulator may be set, as at approximately one pound per square inch, to assure discharge from the outlet 85 at a uniform rate, irrespective of the pressure which may exist upstream in the exhaust line.

A point in the use of the regulator 98 and of the above air loaded regulator 88 is (a) to insure that the rate of fall of pressure in 58 is the same and (b) that the rate of rise of pressure in 58 is the same, regardless of the pressure in 58, which will vary from 0 p. s. i. to 15 p. s. i. or whatever the limiting regulator 92 is set for.

A further point is that by suitably arranging the size of the orifice at 85 the rate of fall can be set as constant at a suitable figure, say 30 sec., from 12 p. s. i. to 5 p. s. i. when the valve stem 97 is in the exhaust position. Likewise, the rate of rise can be matched to this rate of fall of the pressure in 58 by manually adjusting the spring loading on 88 (so as to cause the pressure in 58 to rise from 5 to 12 p. s. i. in 30 sec., when the valve stem 97 is placed in a low position so as to connect 81 with 80). (The motor 106 is, of course, not operating in making these two adjustments.)

When the rate of fall and rate of rise are matched, the control always operates so as to bring the level to the point where the spool valve oscillation causes the pressure in line 58 to rise and fall an equal number of seconds, a condition conducive to optimum stability in the control.

Assuming now that the spool valve 97 remains stationary and the valve casing 82 is reciprocated vertically with a predetermined stroke and that the relative positions of these parts midway of such a stroke are as shown in Fig. 2, it is apparent that each vertical stroke of the valve casing will connect the supply line 86 with the controlled pressure line 78 and with the exhaust line 79 for different periods of the same duration. According to the present invention, the casing 82 is reciprocated with regular frequency and relatively rapid strokes, as at the rate of five reciprocations per minute. These may be adjusted as to amplitude and effected with the desired frequency by utilization of any suitable drive mechanism. As shown, the casing 82 is carried by a hanger 99 which is pivotally supported at 100 by one end of the lever 101 which is pivotally supported at its other end on a fixed position horizontal pivot element 102. The lever 101 is provided with a longitudinal slot 103 in which an eccentric cam 104 is rotatably disposed. The cam 104 is fixed on a drive shaft 105 of a motor 106 which is slidably mounted at 107 on a support 108 so that it can be moved at will in a guided manner to adjust the position of the eccentric cam 104 longitudinally of the slot 103 and thus adjust the amplitude of the reciprocatory strokes of the valve casing 82. The motor 106 may be an electric motor activated by electric current supplied thereto by motor wires 109, 110, 111, respectively. The wires 110 and 111 may lead to the motor from a condenser 112 with which a wire 113 cooperative with the wire 109 is connected, the wires 109 and 113 thus constituting lead wires. A manually operable switch, indicated at 114, may be provided to control the motor operation.

The arrangement just described will assure an inrush of air from the supply line 86 into the controlled pressure line 78 alternating with a rush of air from the controlled pressure line 78 into the exhaust line 79 during each cycle of reciprocation of the valve casing. While the spool valve 97 remains stationary, these additions and subtractions of air to and from the controlled pressure line will cause only slight rapidly recurring pressure rise and fall pulsations therein so that only slight and practically negligible mutually balancing movements of the speed adjusting lever 15, Fig. 1, will take place. However, should the glass level, indicated at 115, in the controlled molten glass container 116, depart from a predetermined index or control point, the spool valve 97 will be moved vertically in its casing in the direction and to an extent corresponding to the change of level so as to increase or decrease the time during which the middle controlled pressure line 78 receives air from the supply line 86 and correspondingly to decrease or increase the time the exhaust line 83 receives air from the middle controlled pressure line. To this end, the spool valve 97 is carried by a vertical stem 117 of a lost motion device, generally designated 118, which is operatively connected to a vertically movable shaft 119 of a glass level gauging mechanism. This mechanism, in the example shown, comprises a vertical feeler 120 carried by a horizontal supporting arm 121 on the shaft 119 so as to depend through a vertical opening 122 in the cover of the glass container 116 toward the glass in such container. An electrical contact element 123 at the lower end of the feeler is suitable for contact with the glass on downward movement of the shaft 119 and its supported feeler and will draw a thread of glass with it for a short distance upward when raised by an upward movement of the shaft 119.

The vertical reciprocations of the shaft 119, in the example shown, are caused by a reversible motor 124, operating through a connected gear reduction unit 125 to drive an upturned shaft 126. This carries and rotates a vertical screw 127 in threaded engagement at 128 with the lower portion of the vertical shaft 119, which is appropriately formed for that purpose. The shaft 119 is, of course, guided for vertical reciprocatory movements, as by vertical guide bearings 129 and 130, respectively.

The operations of the motor 124 are controlled by an electrical motor control mechanism, shown diagrammatically at 131 in Fig. 2. This control mechanism is connected to ground at 132 and also through a wire 133 with the glass contact element 123. The glass is, of course, a conductor and is connected to ground at 134. Wires 135, 136 and 137 lead from the electric motor control mechanism to the motor. The arrangement is such that contact of the feeler contact element 123 with the surface of the glass will close a circuit which will drive the motor in the direction to effect the upward movement of the feeler 120 and this movement will continue until the connecting thread of glass between the contact element 123 and the glass in the container breaks. A second circuit will then be set up to operate the motor in the reverse direction to lower the feeler 120.

The lost motion device 118 prevents actuation of the stem 117 so long as the glass level remains at the index or control point. As shown, the lost motion device comprises a casing 138 having a head or cover member 139 fixedly attached by an arm 140 to the vertical shaft 119 to move therewith. The stem 117 is carried by an upper arm 141 of a yoke 142 which has a lower arm 143 fixed to a vertical stem 144 which projects upwardly from a mechanism, indicated at 145. The arrangement is such that the stem 144, the yoke 142 and the stem 117 will remain in any vertical position to which they have been moved but may be raised or lowered therefrom by positive pressure exerted thereagainst through the lost motion device. The mechanism 145 may be the transmitter of an electric recorder as disclosed in the co-pending application of Madison M. Cannon, Jr., and the present applicant, John S. Light, Serial No. 656,000, filed March 31, 1946, for molten glass level indicator and recorder, owned by the owner of the present application and on which Patent No. 2,483,333 was granted September 27, 1949. This prior joint application also discloses the details of the level gauging mechanism and a lost motion device substantially like the lost motion device 118.

The stem 117 is provided at its lower end with a relatively enlarged head or button, marked 146. This is located within the casing 138 and below the casing head 139, the latter having a central opening at 147 through which the stem 117 depends. Within the casing 138 is an air cylinder 148 in which a piston 149 is disposed. The cylinder is closed at its top by a head 150, except for an opening 151 in such head through which an upstanding rod 152 on the piston 149 may extend. A light coil spring 153 may surround the piston rod between the piston and the head of the cylinder to assure descent of the piston to the lower end of the cylinder when pressure within the lower part of the cylinder will permit. A fluid pressure supply line 154 leads from a valve 155 to a combination intake and exhaust passage 156 in the bottom of the cylinder. The valve 155 has a chamber 157 in which a ball valve 158 is disposed and is movable vertically between a raised, open position, as shown, to a lowered closed position at the bottom of the chamber 157. When in its raised position, the ball valve 158 is above a lateral intake passage 159 with which a supply line 160 is connected. While in its lowered position, the ball valve 158 shuts off communication between the intake passage 159 and the line 154 while permitting exhaust from the line 154 around the valve stem 161 and exhaust also from the chamber of any air entering it from the supply line 160. The valve stem 161 is operatively connected to an electro-magnetic valve opening mechanism 162 which is operatively connected, as by the lines 163 and 164, with the electric motor control mechanism 131 so that the valve 158 is raised only when the motor reverses to raise the level gauge feeler 120 after completion of a downward stroke thereof. The electrical and operating details of the mechanism are fully described in the aforesaid Patent No. 2,483,333. The line 160 may lead through a pressure gauge 165 to a regulator 166 which is connected at 167 to the T 90 of the aforesaid main air intake pipe 91.

With a lost motion mechanism as described, any lowering of the glass level below an index or control point will be attended by a downward movement of the stem 117 as the head 139 of the casing moves downwardly past its former lower limit and pushes the button 146 ahead of it. On completion of the downward level detecting stroke of the feeler, a flow of air through the pipe 154 will raise the piston 149 so that the button 146 would be raised against the head 139 if not already there. If a change of glass level has been upward, the head 139 of the casing of the lost motion device will stop on its next downward stroke above the button 146. The upward stroke of the piston 149 on reversal of the motor 124 then will raise the button 146 by reason of the contact therewith of the upper end of the piston rod 152, thereby raising the stem 117.

Each upward or downward movement of the stem 117 will cause a shifting of the spool valve 97 in its casing and a corresponding rate of decrease or increase in the pressure in the controlled pressure pipe 78 according to whether the level has risen or fallen. Because the rate of increase or decrease of control pressure is proportional to the deviation of the spool valve position from the center of its oscillatory motion of the casing, the rate of increase or decrease will only be zero when the spool valve returns to or remains at this central position, which is the control point. The controlled pressure line 78—58 leads through the connections shown and described to the valve positioner 44, Fig. 1. It hereinbefore has been explained that any decrease or increase in the pressure supplied to this valve positioner will cause a proportional corrective increase or decrease of speed of the controlled charger. The corrective adjustments will be within a proportional band corresponding to the deviations from the predetermined control or index glass level of the mechanism with an automatic restoration of the original spool valve setting after each change thereof so that the correction in the batch charging will be that required to produce charging of an amount so related to the load or pull on the supply tank as to attain and maintain the glass in the controlled container substantially at the level desired.

In an installation employing two of the batch chargers 1 respectively having alternating periods of activity and idleness, each charger, on being started again after a period of idleness, will be operated at the corrected speed which the other charger had when it became idle, the required corrective pressure being supplied to the diaphragm air motor 22 of the control mechanism of the idle charger as soon as the solenoid valves 73 and 74 of the air supply line thereto are opened by the starting of the electric motor operating that charger as hereinbefore explained. It usually is not feasible to adjust a variable speed drive such as that included in the illustrative apparatus shown in the drawings and herein described while such drive is idle.

Various known equivalent and alternative mechanisms may be substituted for the specific mechanisms herein described as comprising elements of the embodiment of the invention now preferred by us. These and numerous other changes and modifications of the illustrative embodiment of the invention herein described will now be apparent or readily occur to those skilled in the art and we, therefore, do not wish to be limited to such details.

We claim:

1. In a glass level control apparatus, the combination of a level gauging mechanism to detect departures from a predetermined control point of the level of molten glass in a forehearth or like container, operationally adjustable means to control the charging rate of apparatus for charging batch to a glass melting tank for supplying molten glass to said container, and control means operatively connecting said level gauging mechanism and said operationally adjustable means and responsive to the former automatically to adjust the latter at a rate proportional to departures of glass level from said predetermined control point detected by said gauging mechanism.

2. The combination defined by claim 1 wherein said level gauging mechanism comprises a reciprocating feeler moving vertically to and from contact with the surface of the molten glass and wherein said control means comprises a vertically movable normally stationary member arranged to be moved with said feeler only when the latter has detected a departure of the level of the molten glass from said predetermined control point and then in the same direction and to the same linear extent as said departure together with means to translate each such movement of the normally stationary control member into a corrective adjustment of the operationally adjustable glass supply control means.

3. The combination defined by claim 1 wherein said control means comprises a supply line for air under a predetermined approximately constant pressure, a controlled pressure air line, an exhaust air line, a valve to control communication between said three lines, means to operate said valve to connect said supply line with said controlled pressure line and the latter with said exhaust line in rapid succession and for like periods of time in cyclic order so long as said glass level remains at said control point, other means operatively connected to said level gauging mechanism and responsive thereto further to operate said valve to vary the relative durations of the connection of the supply line with the controlled pressure line and the controlled pressure line with the exhaust air line, respectively, in the next cycle of operation of said valve by said first named operating means after and in accordance with a departure in the level of the molten glass from said control point and pneumatically operated means operatively connected with said controlled pressure line and responsive to variation of pressure therein to adjust the operation of the batch charging rate control means in accordance with said variation.

4. The combination defined by claim 3 wherein said means further to operate said valve is constructed and arrangeed to eect a relatively increased time of said connection of the air supply line with the controlled pressure line and a relatively decreased time of connection of the controlled pressure line with the exhaust line when the glass level falls below said control point and a reverse of this result when the glass level rises above said control point, with a correspondingly increasing or decreasing pressure in the controlled pressure line, and said pneumatically operated means to adjust the batch charging rate control means is constructed and arranged to adjust the latter to increase the rate of batch charging when the pressure in the controlled pressure line has been relatively increased and to decrease the rate of batch charging when such pressure has been relatively decreased.

5. The combination defined by claim 4 wherein said pneumatically operated means comprises an adjusting lever operatively connected to the glass supply control means, an air motor connected to said lever to operate it, a valve operatively connected to said air motor to control its operation, and a pneumaticaliy operable valve positioner operatively connected with said last named valve and with said controlled pressure air line to operate such valve in accordance with variations of pressure in the controlled pressure air line.

6. The combination with glass batch charging means having a variable speed drive of a movable adjusting member operatively connected with said drive to vary the speed of said batch charging means, an air motor operatively connected to said adjusting member, and means to operate said air motor automatically in accordance with departures from a predetermined control point of the level of molten glass in a container supplied by the operations of said batch charging means.

7. The combination defined by claim 6 wherein said means to operate said air motor includes a molten glass level gauging mechanism, a valve operatively associated therewith and comprising a vertically reciprocable spool valve casing provided with three regularly and vertically spaced apart ports, means to connect the middle of said ports with an outtake air pressure line, means to connect the remaining two ports respectively with an intake air pressure supply line and with an exhaust line, a spool valve disposed in said valve casing so as to control communication from said intake line to the outtake line and from the outtake line to the exhaust line, means to reciprocate said valve casing with regular predetermined frequency and amplitude of stroke and relative to said spool valve to put said intake line in communication with the outtake line and the outtake line in communication with the exhaust line regularly in cyclic order and independently of a change of level of the molten glass, means responsive only to a change of level of the molten glass from a control point to effect an increase in the duration of one of said periods of communication and a like decrease in the other so as to produce a change of pressure in the outtake line, and means to translate said changes of pressure in said outtake line into operations of said air motor.

8. The combination with glass batch charging means having a variable speed drive of a movable adjusting member operatively connected with said drive to vary the speed of said batch charging means, an air motor operatively connected to said adjusting member, and means to operate said air motor automatically in accordance with departures from a predetermined control point of the level of molten glass in a container supplied by the operations of said batch charging means and proportionally to said departures so as to cause the speed of said batch charging means to change at a rate corresponding to the amount of the departure, increasing said speed when said level falls below said control point and decreasing said speed when said level rises above said control point.

9. The combination with glass batch charging means having a variable speed drive of a movable adjusting member operatively connected with said drive to vary the speed of said batch charging means, an air motor operatively connected to said adjusting member, an air line to connect one side of said air motor with a source of supply of air under a substantially constant pressure, other air supply means, including a pilot valve, operatively connected with the other side of said air motor, a pneumatically operable valve positioner to operate said pilot valve, a controlled pressure line operatively connected with the valve positioner to control its action on the pilot valve in accordance with variations in the pressure therein, and automatic means responsive to departures from a predetermined control point of the level of molten glass in a container in which the glass level has a dependent relation to the speed of operation of said charging means to vary the pressure in said controlled pressure line.

10. The combination with glass batch charging means having a variable speed drive of a movable adjusting member operatively connected with said drive to vary the speed of said batch charging means, an air motor operatively connected to said adjusting member, means including manually adjustable pressure regulating means to supply air under a substantially constant pressure to one side of said air motor, means including manually adjustable pressure regulating means and a pilot valve operatively connected with the other side of said air motor to supply air under pressure thereto, a pneumatically operable valve positioner to operate said pilot valve, a controlled pressure line operatively connected with the valve positioner to control its action on the pilot valve in accordance with variations in the pressure therein, automatic means responsive to departures from a predetermined control point of the level of molten glass in a container in which the glass level has a dependent relation to the speed of operation of said charging means to vary the pressure in said controlled pressure line, a two-position three-way valve adapted, when in one position thereof operatively to connect said automatic means with said controlled pressure line leading to said valve positioner, and air supply means, including manually adjustable pressure regulating means operatively connected with said three-way valve so that the latter, when in the second of its said positions, will cut off communication between said automatic means and said controlled pressure line and establish communication between said last named air supply means and said controlled pressure line.

11. In a level control apparatus for a body of molten glass, batch charging apparatus having a variable speed drive, an adjusting member operatively connected to the variable speed drive, an adjusting motor operatively connected to said drive adjusting member, automatic control means responsive to changes of level of said body of molten glass from a predetermined control point to operate said adjusting motor, and manually controllable means operatively connected with said automatic control means and with said motor and operable to throw said automatic control means into and out of operation and to operate said motor while said automatic control means is out of operation.

12. In a level control apparatus for a body of molten glass, the combination with level gauging mechanism to detect departures of the level of said body of molten glass from a predetermined control point and one or more variable speed batch chargers having alternating periods of activity and inactivity, the function of which is related to the level of said body of molten glass, of an adjusting air motor operatively connected to each such batch charger and operable, when actuated, to adjust the speed of its charger while the charger is active, and pneumatic means controlling said air motor and operatively connected with said level gauging mechanism to be responsive thereto to actuate said air motor immediately to adjust the speed of its charger at a rate proportionate to any departure of glass level from said control point when such departure occurs during activity of the charger and to effect a relatively delayed similar actuation of the air motor when its charger is inactive at the time such departure occurs, whereby each of alternately active chargers under control from said level gauging mechanism will after a period of inactivity instantly assume the same speed the other charger would have had, had it continued active.

13. The combination defined by claim 12 wherein the pneumatic means controlling said air motor includes fluid shut-off valve means automatically opened when the batch charger with which the air motor is connected becomes active and automatically closed when the charger becomes inactive.

14. In a control mechanism of the character described, a valve mechanism comprising a stem and a casing therefor, the casing being reciprocable relative to the stem and axially thereof and the stem being connected to move axially relative to the casing from a control point therein corresponding to a predetermined level of molten glass to be controlled in accordance with deviations from such level, said casing being provided with three ports spaced apart regularly and longitudinally thereof, the middle port being an outtake air pressure port, one of the other ports being an intake air pressure port and the third port being an air pressure exhaust port, means to reciprocate said valve casing with a stroke of regular predetermined frequency and amplitude so that, during each cycle of reciprocation of the casing, said outtake air pressure port is in communication with each of said other ports for periods of like duration when the valve stem is at said control point and for relatively increased and decreased time periods when the stem has been moved axially in either direction from the control point by a change of level of the molten glass from said predetermined level, an air pressure supply line connected to said intake air pressure port, a controlled pressure outtake line connected to said outtake pressure port, an exhaust air pressure line connected to said exhaust port and terminating in a bleed orifice of a predetermined selected size, and means associated with said intake air pressure supply line and with said exhaust line to assure equal rates of rise and fall of pressure in said controlled pressure outtake line during each cycle of reciprocation of the valve casing irrespective of the actual pressure in the controlled pressure line at any time during such cycle.

15. In a control mechanism of the character described, a valve mechanism comprising a stem and a casing therefor, the casing being reciprocable relative to the stem and axially thereof and the stem being connected to move axially relative to the casing from a control point therein corresponding to a predetermined level of molten glass to be controlled in accordance with deviations from such level, said casing being provided with three ports spaced apart regularly and longitudinally thereof, the middle port being an outtake air pressure port, one of the other ports being an intake air pressure port and the third port being an air pressure exhaust port, means to reciprocate said valve casing with a stroke of regular predetermined frequency and amplitude so that, during each cycle of reciprocation of the casing, said outtake air pressure port is in communication with each of said other ports for periods of like duration when the valve stem is at said control point and for relatively increased and decreased time periods when the stem has been moved axially in either direction from the control by a change of level of the molten glass from said predetermined level, an air pressure supply line connected to said intake air pressure port, a controlled pressure outtake line connected to said outtake pressure port, an exhaust air pressure line connected to said exhaust port and terminating in a bleed orifice of a predetermined selected size, an air pressure regulator in said exhaust line including a pressure responsive member exposed on one side to the pressure in said exhaust line and on its other side to the atmosphere and loaded to assure a constant predetermined pressure difference between the upstream and outlet ends of said bleed orifice and hence a constant rate of flow through said bleed orifice, and a pressure regulator in the air pressure supply line air loaded from the controlled pressure line and additionally loaded by a means which is adjustable to provide a constant pressure difference between the air pressure supply line and the controlled air pressure line which will produce a rate of flow substantially equal to the flow through the bleed orifice.

JOHN S. LIGHT.
EARL V. De CARLI.

REFERENCES CITED

The following references are of record in the file of this patent:

UNITED STATES PATENTS

| Number | Name | Date |
|---|---|---|
| 624,777 | Fausek | May 9, 1899 |
| 1,050,036 | Mueller | Jan. 7, 1913 |
| 1,511,425 | Roucka | Oct. 14, 1924 |
| 1,787,686 | Kerr | Jan. 6, 1931 |
| 1,928,016 | Halbach et al. | Sept. 26, 1933 |
| 1,961,893 | Wadman et al. | June 5, 1934 |
| 2,094,926 | Nutter | Oct. 5, 1937 |
| 2,455,315 | Rose | Nov. 30, 1948 |